United States Patent
Ito et al.

(10) Patent No.: US 7,017,817 B2
(45) Date of Patent: Mar. 28, 2006

(54) APPARATUS FOR READING INFORMATION CODE

(75) Inventors: Kunihiko Ito, Chiryu (JP); Tadao Nojiri, Oobu (JP)

(73) Assignee: Denso Corporation, Kariya (JP)

( * ) Notice: Subject to any disclaimer, the term of this patent is extended or adjusted under 35 U.S.C. 154(b) by 191 days.

(21) Appl. No.: 10/373,966

(22) Filed: Feb. 27, 2003

(65) Prior Publication Data

US 2003/0160100 A1 Aug. 28, 2003

(30) Foreign Application Priority Data

Feb. 28, 2002 (JP) ........................................ 2002-054275

(51) Int. Cl.
*G06K 7/10* (2006.01)

(52) U.S. Cl. ............................ 235/462.42; 235/462.43; 235/462.44; 235/462.49

(58) Field of Classification Search ........ 235/462.01–49, 235/472.01, 472.03, 454, 455, 462.42, 462.43, 235/462.45
See application file for complete search history.

(56) References Cited

U.S. PATENT DOCUMENTS

| | | | | |
|---|---|---|---|---|
| 4,743,773 A | * | 5/1988 | Katana et al. | 235/462.07 |
| 5,266,788 A | * | 11/1993 | Yamazaki et al. | 235/462.39 |
| 5,291,009 A | * | 3/1994 | Roustaei | 235/462.42 |
| 5,449,892 A | * | 9/1995 | Yamada | 235/462.42 |
| 5,510,607 A | * | 4/1996 | Ishikawa | 235/462.2 |
| 5,585,615 A | * | 12/1996 | Iwanami et al. | 235/462.06 |
| 5,623,137 A | * | 4/1997 | Powers et al. | 235/462.23 |
| 5,825,011 A | * | 10/1998 | Suzuki et al. | 235/472.01 |
| 5,852,288 A | | 12/1998 | Nakazawa et al. | |
| 5,864,128 A | * | 1/1999 | Plesko | 235/462.35 |
| 5,894,348 A | * | 4/1999 | Bacchi et al. | 356/370 |
| 5,912,449 A | * | 6/1999 | Inoue et al. | 235/462.32 |
| 5,992,749 A | * | 11/1999 | Seo | 235/472.01 |
| 6,033,090 A | * | 3/2000 | Seo | 362/252 |
| 6,065,678 A | * | 5/2000 | Li et al. | 235/462.46 |
| 6,347,163 B1 | * | 2/2002 | Roustaei | 382/324 |
| 6,523,920 B1 | * | 2/2003 | Wade et al. | 347/3 |

FOREIGN PATENT DOCUMENTS

| | | |
|---|---|---|
| CN | 291553 | 11/1996 |
| JP | 1-196680 | 8/1989 |
| JP | 2001-307012 | 11/2001 |
| JP | 2003108916 A * | 11/2003 |

\* cited by examiner

*Primary Examiner*—Michael G. Lee
*Assistant Examiner*—Kimberly D. Nguyen
(74) *Attorney, Agent, or Firm*—Posz Law Group, PLC

(57) ABSTRACT

An information code reading apparatus comprises a case, an illuminating light source, and a light receiver. The case has an end portion at which a reading opening is formed. The illuminating light source is disposed within the case and configured to radiate illumination light through the reading opening toward an information code recorded on an object to be read. The light receiver is disposed within the case and configured to receive light reflected from the object through the reading opening. The reflected light returns along a reading light axis residing in a field of view of the light receiver. The reading light axis is oblique to a perpendicular axis to the reading opening, whereby the entire reading opening is illuminated by the light source. The illuminating light source is composed of an area light source disposed outside the field of view in a substantially parallel attitude along the field of view.

23 Claims, 5 Drawing Sheets

APPARATUS FOR READING INFORMATION CODE

BACKGROUND OF THE INVENTION

1. Field of the Invention

The present invention relates to an apparatus for reading information code, and in particular, to the apparatus that has the capability of reading information codes, such as two-dimensional codes and bar codes, from an object to be read, such as an LCD (Liquid Crystal Display) on the surface of which is covered by a transparent protective layer.

2. Description of the Related Art

There has been known a handy information code reading apparatus capable of optically reading information codes, such as bar codes and two-dimensional codes. Such an apparatus has been disclosed by, for example, Japanese Patent Laid-open (KOKAI) publication Nos. 2001-307012 and HEI1(1989)-196680.

This type of information-code reading apparatus is shown in FIG. 9, in which, by way of example, the fundamental configuration of a handy two-dimensional code reading apparatus is schematically provided. The apparatus has a case 1, which can be operated manually by a user. At the tip of the case 1 is formed a rectangular reading opening 1a. In addition, inside the case 1 are a plurality of LEDs (light emitting diodes) 2 serving as light sources, light receiving means including a reflection mirror 3, an imaging lens 4, and a light receiving element 5 such as a CCD area sensor, and a processing circuit 6. The processing circuit 6 is responsible for various types of processing including decoding signals from the light receiving element 5.

This apparatus is handled to locate the reading opening 1a closer to an object 7 to be read (i.e., a label or others) on which a two-dimensional code (such as a QR code) is recorded, with the attitude of the opening 1a being almost parallel to the object. Then, the reading operation is carried out such that light is radiated onto the object 7 to be read from the LED 2 through the reading opening 1a, so that its reflected light can be received through the reading opening 1a. The received light is sent to the light receiving element 5 with the help of the reflection mirror 3 and the imaging lens 4 to read two-dimensional codes. During this reading operation, the case 1 is handled so that a reading light axis O passing through the various components of the light receiving means is set to be nearly perpendicular to the surface of the object 7 to be read.

By the way, it has been general that the conventional information code reading apparatus of this type is produced to read information codes printed on pieces of paper (normally, labels) serving as the object 7 to be read. On the other hand, a new system has recently been conceived which is capable of reading information codes displayed on the screen of, for example, a mobile phone or a liquid crystal display (LCD) unit 8 incorporated in a PDA (Personal Digital Assistance) or others, as shown in FIG. 10.

However, the LCD unit 8 has the screen of which surface is covered by a transparent protective layer 9 (for example, made of a plastic or glass material). Hence, in cases where information codes are to be read from the screen of the LCD unit 8, the illumination light from the LEDs 2 is specularly reflected on the protective layer 9, and the reflected light is projected onto the light receiving element 5. This makes it difficult to read information codes by the light receiving element 5. In addition, as shown in FIG. 10, if the light source (LEDs 2) is disposed within an angle of field "A" of the imaging lens 4, the light source itself shadows in the light reflected from the protective layer 9 to the light imaging element 5, which makes an accurate reading difficult.

SUMMARY OF THE INVENTION

The present invention has been made to overcome the above problem. An object of the present invention is to provide an information code reading apparatus capable of reading information codes on an object to be read, even when a transparent protective layer is placed on the surface of the object.

In order to achieve the foregoing object, as a fundamental configuration of the present invention, there is provided an information code reading apparatus comprising: a case having an end portion at which a reading opening is formed; an illuminating light source disposed within the case and configured to radiate illumination light through the reading opening toward an information code recorded on an object to be read; and a light receiver disposed within the case and configured to receive light reflected from the object through the reading opening, the reflected light returning along a reading light axis residing in a field of view of the light receiver, the reading light axis being oblique to a perpendicular axis to the reading opening, whereby the entire reading opening is illuminated by the light source. The illuminating light source is composed of an area light source disposed outside the field of view in a substantially parallel attitude along the field of view.

When reading the information code on an object to be read, the case of the information code reading apparatus is handled so that the reading opening is located almost in parallel to the object. The light source composed of the area light source is disposed outside of the filed of view of the light receiver, in a parallel attitude to the field of view, so as to face an outer contour of the field of view. Hence the area light source is able to emit illumination light toward the object through the reading opening so that the illumination light covers evenly a whole area to be read on whole object. In addition, the light receiver is disposed to be inclined to the perpendicular axis to the reading opening, that is, the object. Therefore, even when the object has a transparent protective layer thereon, like the screen of a liquid crystal display unit, it is possible that the light receiver resists receiving light specularly reflected from the protective layer.

In other words, the light receiver has less influence of the specular reflection resultant from the protective layer, whereby the receiver is able to primarily receive a diffusive reflection light component among the reflection light from the object. As a result, in cases where an object to be read has a transparent protective layer on the surface, an information code on the object can be read out in a steadier manner. Incidentally, when the information code is a square or rectangular two-dimensional code, an image formed at the light receiver becomes a trapezoid (isosceles trapezoid), but such an image can be read using software processing.

By way of example, the foregoing area light source can be composed of a combination of a plurality of LEDs and a diffusion light, a combination of an LED and a light guiding plate, or an EL (electroluminescence) panel. Using such components allows the area light source to entirely illuminate the object in an easier manner, with a comparatively less space occupied for the installation.

The imaging at the light receiver is affected by various factors, such as a cosine biquadrate rule of the imaging lens. Thus, an amount of light (i.e., resolution) at a peripheral part in the reading opening tends to be lower than a central part thereof, so that a reading capability at the peripheral part is lower than that at the central part. In addition, for reading a one-dimensional code, which is laterally elongated, such as a bar code, it is frequent to handle this kind of information code reading apparatus such that, for example, a head-side area (i.e., one-sided partial area) of the reading opening is made to locate over the one-dimensional code.

Hence, in order to increase an amount of illuminated light at the head-side area of the heading opening, it is preferable to dispose a partial illuminating member at the area light source having as a main body an entire illuminating member. This disposal of the partial illuminating member allows an amount of light, that is, resolution, at the head-side area of the reading opening to be enhanced. It is therefore possible that even if the head-side area is made to locate over the one-dimensional information code for reading, the reading operation can be done with precision.

More concretely, there can be provided the partial illuminating member having a light source different from that of the entire illuminating member. This configuration is effective for largely increasing an amount of light at the heads-side area of the reading opening. Alternatively, it is also preferred that the partial illuminating member is configured to cause the diffusion plate to optically diffuse the illumination light at a angle different from another angle of the illumination light emitted by the entire illumining member. Alternatively, it is still preferred that the partial illuminating member is configured to cause the light guiding plate to guide the illumination light at a angle different from another angle of the illumination light emitted by the main illumining member. According to either of the above alternative configurations, the partial illuminating member can be configured simply.

DETAILED DESCRIPTION OF PREFERRED EMBODIMENTS

Preferred embodiments of the present invention will now be described with reference to accompanying drawings.

In each of the following various embodiments, an explanation will be given to a configuration where the present invention is applied to a handy two-dimensional code reader, which is able to read one-dimensional codes (bar codes) as well as two-dimensional codes (QR (quick response) codes). Furthermore, in the following embodiments, an object to be read having a transparent protective layer thereon will be exemplified as the screen of a liquid crystal display unit (LCD) incorporated in, for example, a mobile phone. Thus, detailed examples provided in the following embodiments are about reading information codes (QR codes) displayed on the LCD screen.

(First Embodiment)

Figure 1:
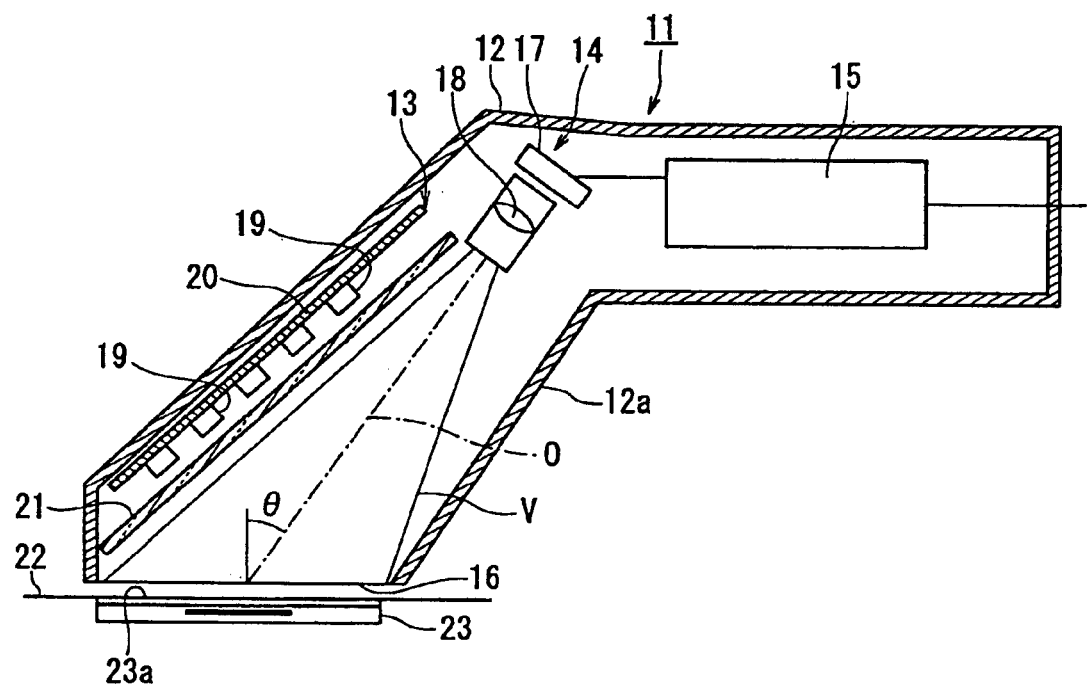
FIG. 1 is a sectional view showing a schematic entire configuration of an information code reading apparatus according to a first embodiment of the present invention.

Referring to FIG. 1, a first embodiment according to the information code reading apparatus will now be described.

FIG. 1 shows a schematic configuration of essential components composing a two-dimensional code reader 11 serving as the information code reading apparatus according to the present embodiment. This two-dimensional code reader 11 has a case 12 operable by a user's one hand, in which there are provided an illuminating light source 13 functioning as light source means, a reading mechanism 14 functioning as light receiving means corresponding to a light receiver of the present invention, and a controller 15. The controller 15 is in charge of various types of processing, such as controlling the whole of the reader 11 and decoding image data that has been read.

The case 12 is shaped into an approximately hollow cylinder having an approximate length along its longitudinal direction, but its tip-side half body is made to be oblique to the remaining body to form a neck-bent portion 12a. At the tip of the neck-bent portion 12a is formed a rectangular reading opening 16. Although not shown in FIG. 1, a display unit and a key operation unit are placed on an outer surface of the case 12, which provides an upper surface in use, while a trigger switch is put on the two lateral sides of the case 12.

The reading mechanism 14 is provided with a light receiving element 17 composed of a CCD area sensor and an imaging lens 18 placed in front of the light receiving element 17 on the incidence side of light reflected from an object to be read. This reading mechanism 14 is located at a central part or thereabout in the longitudinal path of the case 12, that is, at a position from which the neck-bent portion 12a begins to bend. A reading optical axis O, which is set through the reading mechanism 14, is oblique by an angle of θ to a perpendicular axis to the reading opening 16. In addition, a field of view V given to the reading mechanism 14 is formed to be projected to the reading opening 16, and the dimension of the field of view V is approximately equal to or slightly smaller than that of the reading opening 16. In FIG. 1, only an outermost contours (expressing an angle of view) of the field of view V are shown.

The illuminating light source 13 is composed of a relatively larger area light source and located within the neck-bent portion 12a. To be specific, as shown in FIG. 1, the area light source serving as the illuminating light source 13 is placed on an inner wall of the neck-bent portion 12a. That is, the area light source is located outside the field of view V and extends, approximately in parallel thereto, along an outer contour of the field of view V. The illuminating light source 13 includes a plurality of LEDs 19, a substrate 20 on which the LEDs 19 are mounted, and a diffusion plate 21 located in front of the LEDs 19. Hence, the illuminating light source 13 is able to illuminate the whole area of the reading opening 16.

When a user desires to read an information code (QR code) recorded on an object to be read, the user handles this reader 11 to locate the reading opening 16 of the case 12 closely to the information code in an approximately parallel attitude to the object. And the operator turns on the trigger switch to have the code read out. Responsively to the switch-on operation, light beams of illumination for reading codes are emitted from the illuminating light source 13 toward the object through the reading opening 16. The light reflected by the object is received by the reading mechanism 14 through the reading opening 16, and the information code is read out from the received light.

As a result, the reader 11 according to the present invention is able to cope with reading information from a liquid crystal display (LCD) unit 23 mounted to for example a mobile phone 22, as shown in FIG. 1. That is, the two-dimensional code reader 11 has the capability of reading an information code (QR code) displayed on the screen of the LCD unit 23. On the outer surface of the LCD unit 23 is a transparent protective layer 23a made of glass or plastic material, while behind the protective layer 23a is a liquid crystal layer on which information codes appear. In the case that the object to be read is the LCD unit 23, it is required that the light be emitted through the protective layer 23a to reach the liquid crystal layer for reading an information code displayed on the liquid crystal layer.

In this two-dimensional code reader 11, the illuminating light source 13 consisting of the area light source, which is disposed outside along the outer contour of the field of view V, operates to emit illumination light onto the whole screen of the LCD unit 23 through the reading opening 16. In addition, the reading mechanism 14 is disposed such that its optical axis O is oblique to the perpendicular axis to the reading opening 16, that is, the screen of the LCD unit 23. Accordingly, even if there is the transparent protective layer 23a on the surface (screen) of the LCD unit 23, the reading mechanism 14 will resist receiving the specular reflection of the light on the protective layer 23a.

As a result, of the reflection light from the screen of the LCD unit 23, a diffusive reflection component can selectively be received by the reading mechanism 14. It is therefore possible that the LCD unit 23 on which the transparent protective layer 23a is mounted is allowed to undergo reading the information codes without failure. Additionally, in the present embodiment, the illuminating light source 13 composed of the area light source is disposed outside along the outer contour of the field of view V, thus preventing the case 12 from increasing in size in a radial direction crossing the optical axis O.

In the present embodiment, if the two-dimensional information code is a square or rectangular two-dimensional code, an image produced at the light receiver 17 becomes a trapezoid (i.e., isosceles trapezoid). Even in such case, however, software processing makes it possible to read the square or rectangular two-dimensional code. Additionally, when pieces of paper on which a two-dimensional code is printed (such as labels) are subjected to reading code information, the reading operation can be done with steadiness. One-dimensional codes, such as bar codes, can also be read by this two-dimensional code reader 11.

(Second Embodiment)

Figure 2:
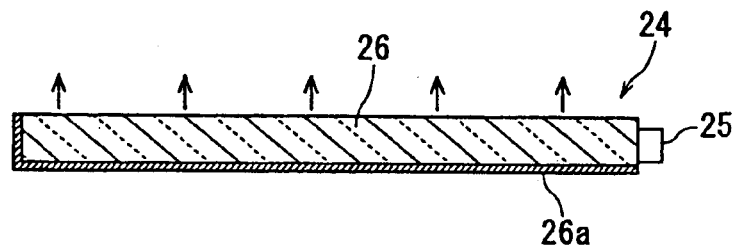
FIG. 2 is a longitudinal section showing the configuration of an illuminating light source employed by an information code reading apparatus according to a second embodiment of the present invention.

Referring to FIG. 2, a second embodiment of the present invention will now be described, in which there is shown a modification of the illuminating light source. Specifically, there is provided an illuminating light source 24 serving as light source means consisting of an area light source.

The illuminating light source 24 has at least one LED 25 that provides a light source and a light guiding plate 26. Although not shown in detail in the figure, the light guiding plate 26 is composed of a light guiding layer, prism sheet, cover, and others, and an optical reflection plate 26a is attached to the back of the light guiding plate 26. Thus, like the first embodiment, this modified configuration is able to provide the similar operations and advantages to those obtained in the first embodiment.

Figure 3:
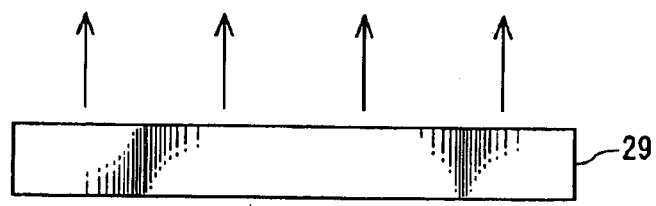
FIG. 3 is a sectional view showing an illuminating light source according to a modification of the second embodiment.

Of course, the light source means is not limited to the above configuration. For instance, as shown in FIG. 3, an EL (electroluminescence) panel 29 can be used as the light source means consisting of an area light source.

(Third Embodiment)

Figure 4:
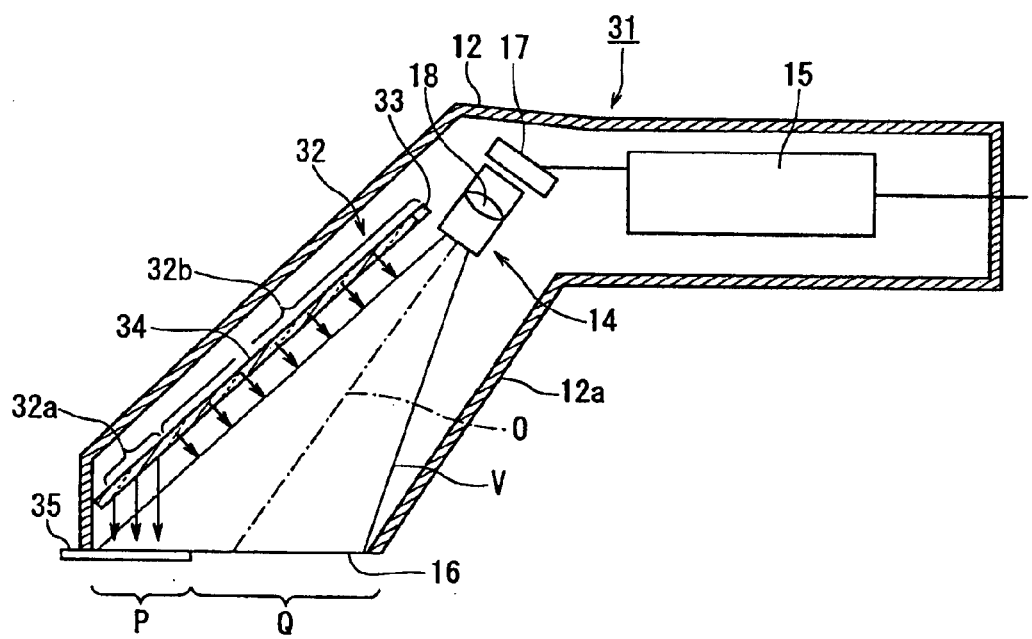
FIG. 4 is a sectional view showing a schematic entire configuration of an information code reading apparatus according to a third embodiment of the present invention.
Figure 5:
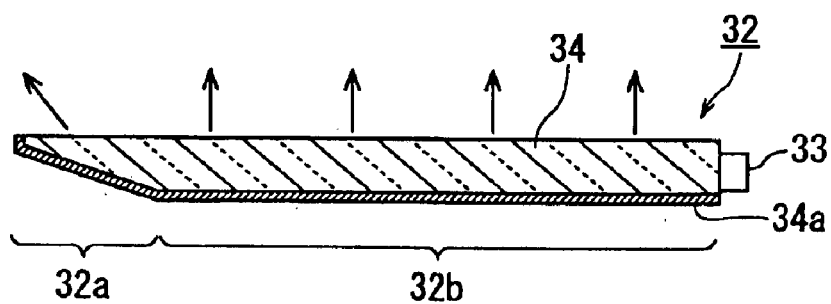
FIG. 5 is a longitudinal section showing the configuration of an illuminating light source employed by an information code reading apparatus according to a third embodiment of the present invention.

Referring to FIGS. 4 and 5, a third embodiment of the present invention will now be described, which exemplifies another two-dimensional code reader. This reader differs from that of the first embodiment in the configuration of only the light source means. The remaining components, such as the case 12 and the reading mechanism 14, according to the present embodiment are identical to those in the first embodiment, which are given the same references. Hence explanations are mainly given to only the component different from that in the first embodiment, thus avoiding redundancy in the explanations. This explanation technique will also be applied to embodiments that follows the third embodiment.

FIG. 4 shows a schematic configuration of essential components employed by a two-dimensional code reader 31 corresponding to the information code reading apparatus according to the present invention. This two-dimensional code reader 31 has the case 12 having the reading opening 16. In the case 12 are an illuminating light source 32 consisting of an area light source and serving as the light source means, the reading mechanism 14 including the light receiving element 17 and the imaging lens 18 both of which compose light receiving means (light receiver), a controller 15, and others. The illuminating light source 32 includes a head-side illuminating member 32a for partially increasing an amount of light projected primarily toward a head-side area P (a leftward area in FIG. 3) of the reading opening 16. This head-side illuminating member 32a is one mode of the partial illuminating member according to the present invention. The residual part of the illuminating light source 32, other than the head-side illuminating member 32a, functions as an entire illuminating member 32b for projecting light almost evenly toward the whole of the reading opening 16.

In the present embodiment, the illuminating light source 32 includes at least one LED 33 functioning as a light source, a light guiding plate 34 to which the LED 33 emits light, and an optical reflection plate 34a on which the light guiding plate 34 is mounted (refer to FIG. 5). In this configuration, the head-side illuminating member 32a is formed so that the illumination angle from the light guiding plate 34 is differentiated from each other between the head-side area P and the remaining area Q other than the head-side area P in the reading opening 16. More concretely, a shown in FIG. 5, the back of the light guiding plate 34 is partly bent at a given position near to the tip thereof by a given amount of angle. Hence, the entire illuminating member 32b of the light guiding plate 34 emits light mostly at a right angle to the plate 34. On the other hand, the head-side illuminating member 32a thereof emits light mostly at a given obtuse angle made to the plate 34, that is, at a given oblique angle deviating from an approximately perpendicular direction to the reading opening 16. Therefore, an amount of light illuminated onto the head-side area P of the reading opening 16 is increased and larger than that onto the remaining area Q thereof.

The imaging at the reading mechanism 14 is affected by various factors, such as the cosine biquadrate rule at the imaging lens 18. Thus, an amount of light (i.e., resolution) at a peripheral part in the reading opening 16 tends to be lower than a central part thereof, so that a reading capability at the peripheral part is lower than that at the central part. Regardless of being such a situation, for reading a one-dimensional code, which is laterally elongated, such as a bar code, it is frequent to locate this two-dimensional code reader 31 such that a head-side area P of the reading opening 16 is located just over the screen of the object 35 to be read (such as an LCD unit), as shown in FIG. 4.

In the present embodiment, in addition to gaining the similar operations and advantages to those in the first embodiment, further additional advantages can be given. For example, since the illuminating light source 32 includes the head-side illuminating member 32a at its one end, an amount of light at the head-side area P of the reading opening 16 can particularly be raised, whereby the resolution thereat can be improved greatly. Therefore the reading operation through the head-side area P can be conducted well even if the head-side area P is located over the information code on the object 35. In addition, the head-side illuminating member 32a can be formed into a simpler structure, because only adjusting the illumination angles from the light guiding plate 34 can form the member 32a.

(Fourth Embodiment)

Figure 6:
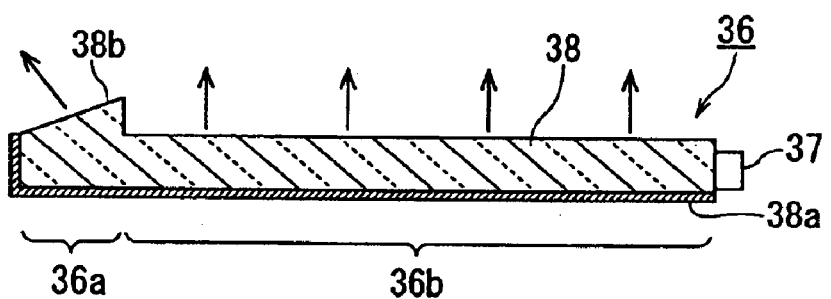
FIG. 6 is a longitudinal section showing the configuration of an illuminating light source employed by an information code reading apparatus according to a fourth embodiment of the present invention.

Referring to FIG. 6, a fourth embodiment of the present invention will now be described, which shows anther example of the illuminating light source according to the present invention.

FIG. 6 illustrates the configuration of an illuminating light source 36 serving as the light source means in this embodiment. Like the forgoing embodiments, the illuminating light source 36 is provided with at least one LED 37 that serves as a light source and a light guiding plate 38 on which back an optical reflection plate 38a is attached for optical reflection. At one end (the tip) of the light guiding plate 38 is formed an illumination-angle changing part 38b to protrude from the light-emitting frontal surface, thus the tip constituting a head-side illuminating member 36a corresponding to the partial illuminating member of the present embodiment. Hence, an entire illuminating member 36b other than the head-side illuminating member 36a in the light guiding plate 36 emits light mostly at a right angle to the plate 36. On the other hand, the head-side illuminating member 36a thereof emits light mostly at a given obtuse angle made to the plate 36, that is, at a given oblique angle deviating from an approximately perpendicular direction to the reading opening 16. Therefore, an amount of light illuminated onto the headside area P of the reading opening 16 is increased and larger than that onto the remaining area Q thereof. The similar operations and advantages to that obtained by the third embodiment can therefore be provided as well.

(Fifth Embodiment)

Figure 7:
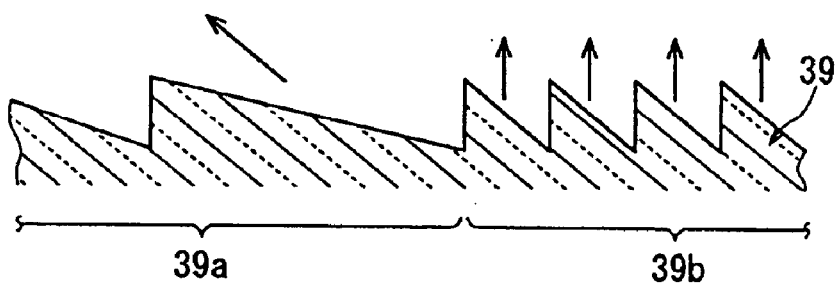
FIG. 7 shows an enlarged longitudinal view of the surface of a diffusion plate employed by an information code reading apparatus according to a fifth embodiment of the present invention.

Referring to FIG. 7, a fifth embodiment of the present invention will now be described, which shows anther example of the illuminating light source according to the present invention.

Like the foregoing embodiments, though not shown in detail, an illuminating light source serving as the light source means is provided in this embodiment. The illuminating light source is provided with a plurality of LEDs that serve as light sources and an optical diffusion plate 39. Irregularities, such as triangular-waveform irregularities in section, are formed on the surface of the diffusion plate 39. The shapes of the irregularities are differentiated from each other between two portions corresponding to a head-side illuminating member 39a and an entire illuminating member 39b of the diffusion plate 39. Hence, the entire illuminating member 39b other than the head-side illuminating member 39a of the illuminating light source emits light mostly at a right angle to the plate 39. On the other hand, the head-side illuminating member 39a thereof emits light mostly at a given obtuse angle made to the plate 39, that is, at a given oblique that deviates from an approximately perpendicular direction to the reading opening 16. Therefore, an amount of light illuminated onto the head-side area P of the reading opening 16 can be increased and larger than that onto the remaining area Q thereof. The similar operations and advantages to that obtained by the third embodiment can therefore be provided as well.

(Sixth Embodiment)

Figure 8:
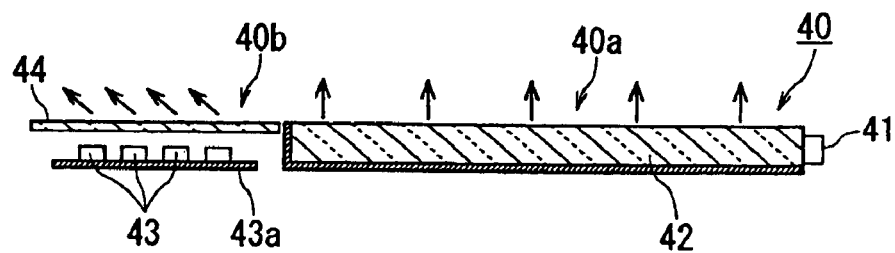
FIG. 8 is a longitudinal section showing the configuration of an illuminating light source employed by an information code reading apparatus according to a sixth embodiment of the present invention.
Figure 9:
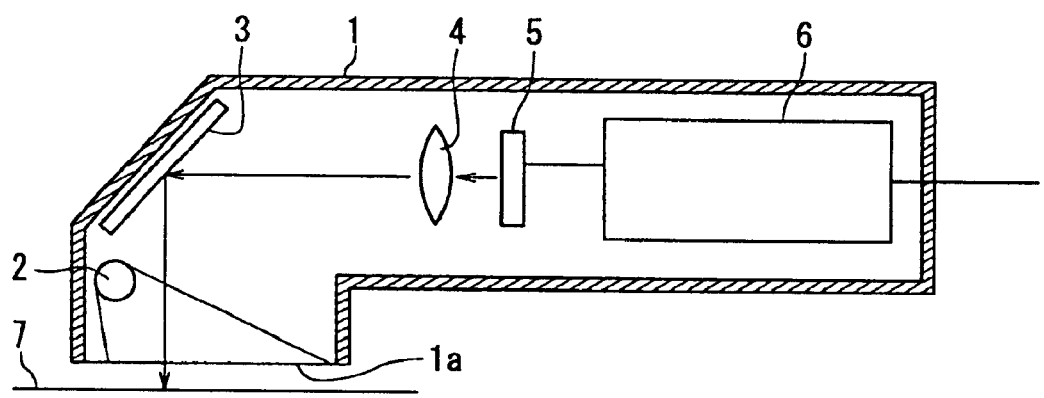
FIG. 9 shows a fundamental configuration of a conventional information code reading apparatus.
Figure 10:
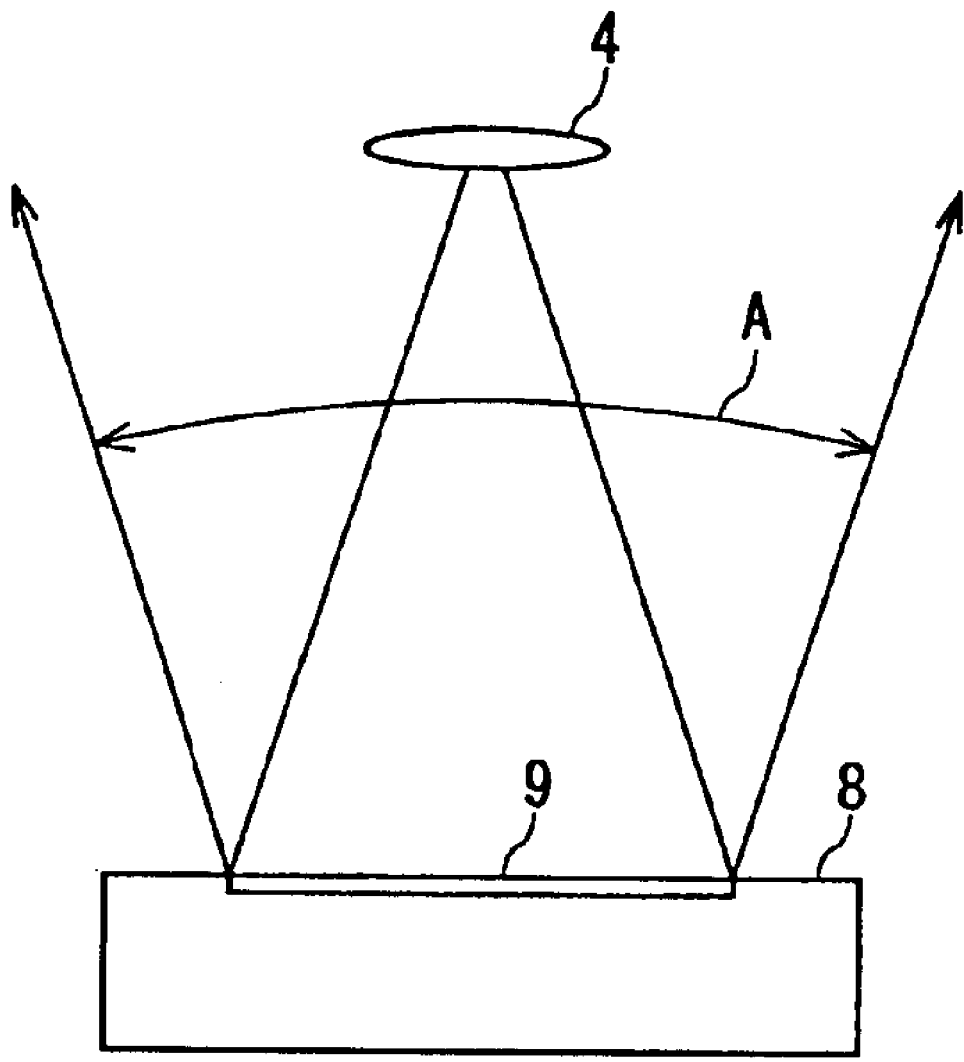
FIG. 10 is an illustration to explain a drawback that the conventional information code reading apparatus encounters when it reads information codes on an LCD screen.

Referring to FIG. 8, a sixth embodiment of the present invention will now be described, which still shows anther example of the illuminating light source according to the present invention.

FIG. 8 shows an illuminating light source 40 serving as the light source means in this embodiment. The illuminating light source 40 has an entire illuminating member 40a and a head-side illuminating member 40b, in which mutually different light sources are placed, respectively. The entire illuminating member 40a, which is directed to an illumination toward almost all of the reading opening 16, is provided with at least one LED 41 and a light guiding plate 42.

On the other hand, to partially illuminating the head-side area P in the reading opening, the head-side illuminating member is equipped with a plurality of LEDs 43 mounted on a base plate 43a and an optical diffusion plate 44 disposed in front of the LEDs 43. This allows an amount of light projected onto the head-side area P of the reading opening 16 to be increased partially, with the result that reading an information code at a position below the head-side area P can be done with steadiness. In this configuration, the head-side illuminating member 40b includes light sources (i.e., LEDs 43) different from that (i.e., LED 41) of the entire illuminating member 40a. This results in that the degree of freedom for controlling amounts of light in each of the head-side area P and the entire reading opening 16 can be raised, thus leading to a well-controlled balance of intensity of light between the head-side area P and the entire reading opening 16.

The present invention is not limited to the configurations presented by the above-listed embodiments, but may be developed into various other forms that can be described as further modifications. For example, the information code reading apparatus of the present invention can be practiced into a fixed type of apparatus, not limited to the handy code reader as described above. Furthermore, the casing of the information code reading apparatus and internal structures therein may also be modified into various other modes, such as the employment of a reflection mirror(s) as the light receiver. In addition, the head-side illuminating member that has been adopted as the partial illuminating member of the present invention may be changed to other locations to the entire illuminating member, not limited to the disposal at one tip end thereof. For example, if necessary, the partial illuminating member is disposed at a central region of the entire illuminating member.

The present invention may be embodied in several other forms without departing from the spirit thereof. The present embodiments as described is therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. An information code reading apparatus comprising:
   a case having an end portion at which a reading opening is formed;
   an area light source disposed within the case and configured to radiate illumination light through the reading opening toward an information code recorded on an object to be read; and
   a light receiver disposed within the case and configured to receive light reflected from the object through the reading opening, the reflected light returning along a reading light axis residing in a field of view of the light receiver, the reading light axis being oblique to a perpendicular axis to the reading opening,
   wherein the area light source is disposed outside the field of view in a substantially parallel attitude to and along the field of view and comprises an entire illuminating member emitting the illumination light mainly toward the entire reading opening, and a partial illuminating member, which is located at a side portion of the area light source, and which emits the illumination light mainly toward a peripheral partial area of the reading opening near to the side portion of the area light source.

2. The information code reading apparatus according to claim 1, wherein the partial illuminating member has a first light source and the entire illuminating member has a second light source different from the first light source.

3. The information code reading apparatus according to claim 1, wherein the area light source comprises at least one light source emitting the illumination light and a light guiding plate guiding the illumination light emitted by the light source, an optical reflection plate being mounted on at least a back of the light guiding plate,
   wherein part of the back of the light guiding plate is bent at a given angle, a portion of the area light source formed by the bent back serving as the partial illuminating member and a remaining portion of the area light source, which is other than the partial illuminating member, serving as the entire illuminating member.

4. The information code reading apparatus according to claim 1, wherein the area light source comprises at least one light source emitting the illumination light and a light guiding plate guiding illumination light emitted by the light source, an optical reflection plate being mounted on at least a back of the light guiding plate, and
   wherein part of a frontal surface of the light guiding plate protrudes to change an angle of the illumination light emitted from the frontal surface, a portion of the area light source formed by the protruded portion serving as the partial illuminating member and a remaining portion of the area light source, which is other than the partial illuminating member, serving as the entire illuminating member.

5. An information code reading apparatus according to claim 1,
   wherein the case has a neck-bent casing portion which provides a head portion, at a bottom of which the reading opening is formed, and
   wherein the peripheral partial area of the reading opening faces the head portion of the case.

6. An information code reading apparatus comprising:
   a case having an end portion at which a reading opening is formed;
   an area light source disposed within the case and configured to radiate illumination light through the reading opening toward an information code recorded on an object to be read; and
   a light receiver disposed within the case and configured to receive light reflected from the object through the reading opening, the reflected light returning along a reading light axis residing in a field of view of the light receiver, the reading light axis being oblique to a perpendicular axis to the reading opening,
   wherein the area light source is disposed outside the field of view in a substantially parallel attitude to and along the field of view, and comprises a plurality of light sources each radiating the illumination light and an optical diffusion plate optically diffusing the illumination light radiated from the light sources, and
   wherein the optical diffusion plaza has a surface on which irregularities are formed to allow the area light source to produce both of an entire illuminating member emitting the illumination light mainly toward the entire reading opening and a partial illuminating member located at a side portion of the area light source to emit the illumination light mainly toward a peripheral partial area of the reading opening near to the side portion of the area light source.

7. The information code reading apparatus according to claim 6, wherein the partial illuminating member is configured to cause the diffusion plate to optically diffuse the illumination light at an angle different from an angle of the illumination light emitted from the entire illuminating member.

8. The information code reading apparatus according to claim 6, wherein the plurality of light sources are composed of a plurality of light emitting diodes (LSDs).

9. An information code reading apparatus comprising:
   a case having an end portion at which a reading opening is formed;
   an area light source disposed within the case and configured to radiate illumination light through the reading opening toward an information code recorded on an object to be read; and
   a light receiver disposed within the case and configured to receive light reflected from the object through the reading opening, the reflected light returning along a reading light axis residing in a field of view of the light receiver, the reading light axis being oblique to a perpendicular axis to the reading opening,
   wherein the area light source is disposed outside the field of view in a substantially parallel attitude to and along the field of view and which comprises at least one light source radiating the illumination light, and a a light guiding plate for guiding the illumination light radiated from the light sources, and
   wherein the light guiding plate has an entire illuminating member emitting the illumination light mainly toward the entire reading opening, and a partial illuminating member disposed at a side portion of the area light source to emit the illumination light mainly toward a peripheral partial area of the reading opening near to the side portion of the area light source.

10. The information code reading apparatus according to claim 9, wherein the partial illuminating member is configured to cause the light guiding plate to guide the illumination light at an angle different from an angle of the illumination light emitted from the entire illuminating member.

11. The information code reading apparatus according to claim 9, wherein the at least one light source is composed of one or more light emitting diodes (LEDs).

12. The information code reading apparatus according to claim 9, wherein an optical reflection plate is mounted on at least a back of the light guiding plate, wherein part of the back of the light guiding plate is bent at a given angle, a portion of the area light source formed by the bent back serving as the partial illuminating member and a remaining portion of the area light source, which is other than the partial illuminating member, serving as the entire illuminating member.

13. The information code reading apparatus according to claim 9, wherein an optical reflection plate is mounted on at least a back of the light guiding plate, wherein part of a frontal surface of the light guiding plate protrudes to change an angle of the illumination light emitted from the frontal surface, a portion of the area light source formed by the protruded portion serving as the partial illuminating member and a remaining portion of the area light source, which is other than the partial illuminating member, serving as the entire illuminating member.

14. An information code reading apparatus comprising:

a case having an end portion at which a reading opening is formed;

an area light source disposed within the case and configured to radiate illumination light through the reading opening toward an information code recorded on an object to be read; and a light receiver disposed within the case and configured to receive light reflected from the object through the reading opening, the reflected light returning along a reading light axis residing in a field of view of the light receiver, the reading light axis being oblique to a perpendicular axis to the reading opening, wherein the area light source is disposed outside the field of view in a substantially parallel attitude to and along the field of view, and comprises an electroluminescence (EL) panel radiating the illumination light, an entire illuminating member emitting the illumination light mainly toward the entire reading opening, and a partial illuminating member disposed at a side portion of the area light source to emit the illumination light mainly toward a peripheral partial area of the reading opening near to the side portion of the area light source.

15. The information code reading apparatus according to claim 14, wherein the partial illuminating member has a light source different from a light source different from the entire illuminating member.

16. An information code reading apparatus comprising:

a case having an end portion at which a reading opening is formed;

an area light source disposed within the case and configured to radiate illumination light through the reading opening toward an information code recorded on an object to be read, wherein the area light source comprises an entire illuminating member emitting the illumination light mainly toward the entire reading opening and a partial illuminating member formed at a side portion of the area light source and emitting the illumination light mainly toward a peripheral partial area of the reading opening; and a light receiver disposed within the case and configured to receive light reflected from the object through the reading opening.

17. An information code reading apparatus according to claim 16, wherein the light receiver provides a field of view in which a reading light axis exists and is oblique to a perpendicular axis to the reading opening, light reflected from the object returns along the reading light axis, and the area light source is disposed outside the field of view.

18. An information code reading apparatus according to claim 17, wherein the case has a neck-bent casing portion which provides a head portion, at a bottom of which the reading opening is formed, and in which the field of view of the receiver is formed and the area light source is disposed along an outer contour of the field of view with the side portion thereof nearer to the reading opening than a side portion opposite to the side portion, and wherein the peripheral partial area of the reading opening faces the head portion of the case.

19. An information code reading apparatus according to claim 18, wherein the area light source is disposed so that the partial illuminating member is nearer to the reading opening than is the entire illuminating member.

20. An information code reading apparatus according to claim 18, wherein the peripheral partial area of the reading opening is positioned on a head side of the reading opening formed by the neck-bent casing portion.

21. The information code reading apparatus according to claim 16, wherein the area light source comprises at least one light source emitting the illumination light and a light guiding plate guiding the illumination light emitted by the light source, an optical reflection plate being mounted on at least a back of the light guiding plate, and wherein part of the back of the light guiding plate is bent at a given angle, a portion of the area light source formed by the bent back serving as the partial illuminating member and a remaining portion of the area light source, which is other than the partial illuminating member, serving as the entire illuminating member.

22. The information code reading apparatus according to claim 16, wherein the area light source comprises at least one light source emitting the illumination light and a light guiding plate guiding the illumination light emitted by the light source, an optical reflection plate being mounted on at least a back of the light guiding plate, wherein part of a frontal surface of the light guiding plate protrudes to change an angle of the illumination light emitted from the frontal surface, a portion of the area light source formed by the protruded portion serving as the partial illuminating member and a remaining portion of the area light source, which is other than the partial illuminating member, serving as the entire illuminating member.

23. The information code reading apparatus according to claim 16, wherein the area light source comprises a plurality of light sources each radiating the illumination light and an optical diffusion plate optically diffusing the illumination light radiated from the light sources, and wherein the optical diffusion plate has a surface on which irregularities are formed to allow the area light source to produce both of the entire illuminating member and the partial illuminating member.

* * * * *

UNITED STATES PATENT AND TRADEMARK OFFICE
CERTIFICATE OF CORRECTION

PATENT NO. : 7,017,817 B2  Page 1 of 1
APPLICATION NO. : 10/373966
DATED : February 27, 2003
INVENTOR(S) : Kunihiko Ito It is certified that error appears in the above-identified patent and that said Letters Patent is hereby corrected as shown below:

<u>Title page, item 73</u>

Assignee: should read -- DENSO WAVE INCORPORATED, Tokyo Japan --

Signed and Sealed this

Fourth Day of December, 2007

JON W. DUDAS
*Director of the United States Patent and Trademark Office*

UNITED STATES PATENT AND TRADEMARK OFFICE
CERTIFICATE OF CORRECTION

PATENT NO. : 7,017,817 B2  
APPLICATION NO. : 10/373966  
DATED : March 28, 2006  
INVENTOR(S) : Kunihiko Ito Page 1 of 1

It is certified that error appears in the above-identified patent and that said Letters Patent is hereby corrected as shown below:

<u>Title page, item 73</u>

Assignee: should read -- DENSO WAVE INCORPORATED, Tokyo Japan --

This certificate supersedes the Certificate of Correction issued December 4, 2007.

Signed and Sealed this

First Day of January, 2008

JON W. DUDAS  
*Director of the United States Patent and Trademark Office*